(12) United States Patent
Cros et al.

(10) Patent No.: US 10,183,760 B2
(45) Date of Patent: Jan. 22, 2019

(54) AIRCRAFT COMPRISING AT LEAST ONE EMERGENCY BEACON, AND SUCH AN EMERGENCY BEACON

(71) Applicant: Airbus (S.A.S.), Blagnac (FR)

(72) Inventors: Christophe Cros, L'Union (FR); Alain Fontaine, Toulouse (FR)

(73) Assignee: Airbus (S.A.S.), Blagnac (FR)

( * ) Notice: Subject to any disclaimer, the term of this patent is extended or adjusted under 35 U.S.C. 154(b) by 153 days.

(21) Appl. No.: 14/841,237

(22) Filed: Aug. 31, 2015

(65) Prior Publication Data

US 2016/0075445 A1 Mar. 17, 2016

(30) Foreign Application Priority Data

Sep. 12, 2014 (FR) ...................................... 14 58590

(51) Int. Cl.
| | |
|---|---|
| *B64D 45/00* | (2006.01) |
| *B64D 25/20* | (2006.01) |
| *B64D 47/06* | (2006.01) |
| *B64D 17/00* | (2006.01) |
| *G01S 5/02* | (2010.01) |

(52) U.S. Cl.
CPC ............. *B64D 45/00* (2013.01); *B64D 17/00* (2013.01); *B64D 25/20* (2013.01); *B64D 47/06* (2013.01); *G01S 5/0231* (2013.01); *B64D 2045/0065* (2013.01); *Y02T 50/53* (2013.01)

(58) Field of Classification Search
CPC ........ B64D 25/20; B64D 47/02; B64D 47/06; B64D 2045/0065; G01S 5/0231
See application file for complete search history.

(56) References Cited

U.S. PATENT DOCUMENTS

| | | |
|---|---|---|
| 2,160,974 A | 6/1939 | Lueck |
| 2,628,307 A | 2/1953 | Lloyd et al. |
| 2,836,143 A | 5/1958 | Shofi |
| | (Continued) | |

FOREIGN PATENT DOCUMENTS

| | | |
|---|---|---|
| FR | 2 968 276 A1 | 6/2012 |
| GB | 796 264 A | 6/1958 |

OTHER PUBLICATIONS

French Search Report for Application No. 14 58590 dated May 4, 2015.

*Primary Examiner* — Tien Q Dinh
*Assistant Examiner* — Alexander V. Giczy
(74) *Attorney, Agent, or Firm* — Jenkins, Wilson, Taylor & Hunt, P.A.

(57) ABSTRACT

An emergency beacon is configured to replace of one or more navigation lamps installed on an aircraft, which has a fuselage with an outer face, on which is fixed a second interface, on which such a navigation lamp is typically disposed; the emergency beacon includes a base, which has a first interface configured to cooperate with the second interface of the aircraft to fix the base onto the outer face of the fuselage; a casing with a control unit, a radio transmitter for transmitting a distress signal, and a detector to detect abnormal aircraft behavior; and a fixing structure to take up a fixation position, ensuring the casing is fixed to the base, or a separation position, in which it does not ensure the casing is fixed to the base; the transition from fixation position to separation position is controlled by the control unit when an abnormal behavior is detected.

9 Claims, 4 Drawing Sheets

(56) References Cited

U.S. PATENT DOCUMENTS

| Patent/Publication No. | | Date | Inventor | Classification |
|---|---|---|---|---|
| 2,959,671 | A * | 11/1960 | Stevinson | B64D 25/20 244/1 R |
| 2,966,674 | A | 12/1960 | Clark | |
| 2,974,898 | A * | 3/1961 | Stevinson | B64D 25/20 244/1 R |
| 3,137,458 | A * | 6/1964 | Hagan | B64D 45/00 116/202 |
| 3,140,847 | A | 7/1964 | Ames, Jr. | |
| 3,181,809 | A * | 5/1965 | Lobelle | B64D 45/00 244/1 R |
| 3,253,810 | A * | 5/1966 | Penn | B64D 45/00 244/138 A |
| 3,553,587 | A * | 1/1971 | Aass | H04B 1/034 455/96 |
| 3,656,160 | A * | 4/1972 | Burton | G01S 5/0226 343/702 |
| 3,978,410 | A * | 8/1976 | Fletcher | H04B 1/034 343/705 |
| 5,283,643 | A * | 2/1994 | Fujimoto | B64D 45/00 340/973 |
| 5,394,142 | A * | 2/1995 | Dusart | G08B 1/08 280/735 |
| 5,661,486 | A * | 8/1997 | Faivre | G01C 21/00 342/33 |
| 5,855,450 | A * | 1/1999 | Richard | B63C 9/22 114/378 |
| 5,890,079 | A * | 3/1999 | Levine | B64F 5/00 340/961 |
| 6,260,508 | B1 * | 7/2001 | Morse | B63C 9/0005 116/211 |
| 6,431,728 | B1 * | 8/2002 | Fredericks | B60Q 1/2696 340/901 |
| 8,670,879 | B1 | 3/2014 | Angelucci | |
| 8,706,357 | B1 * | 4/2014 | van den Heuvel | B64D 45/00 701/14 |
| 8,727,263 | B2 | 5/2014 | Fabre et al. | |
| 2002/0101189 | A1 * | 8/2002 | Vo | F21V 29/87 315/241 S |
| 2003/0152145 | A1 * | 8/2003 | Kawakita | H04N 5/77 375/240.12 |
| 2007/0164875 | A1 * | 7/2007 | Fredericks | B64D 47/06 340/815.45 |
| 2011/0019430 | A1 * | 1/2011 | Wilkinson | H05B 33/0866 362/470 |
| 2012/0113575 | A1 * | 5/2012 | Uy | G01S 5/0231 361/679.01 |
| 2013/0077331 | A1 * | 3/2013 | Hessling | F21S 48/32 362/470 |
| 2014/0142803 | A1 * | 5/2014 | Argillier | B64D 45/00 701/33.4 |
| 2014/0263839 | A1 * | 9/2014 | van den Heuvel | B64D 45/00 244/137.1 |

* cited by examiner

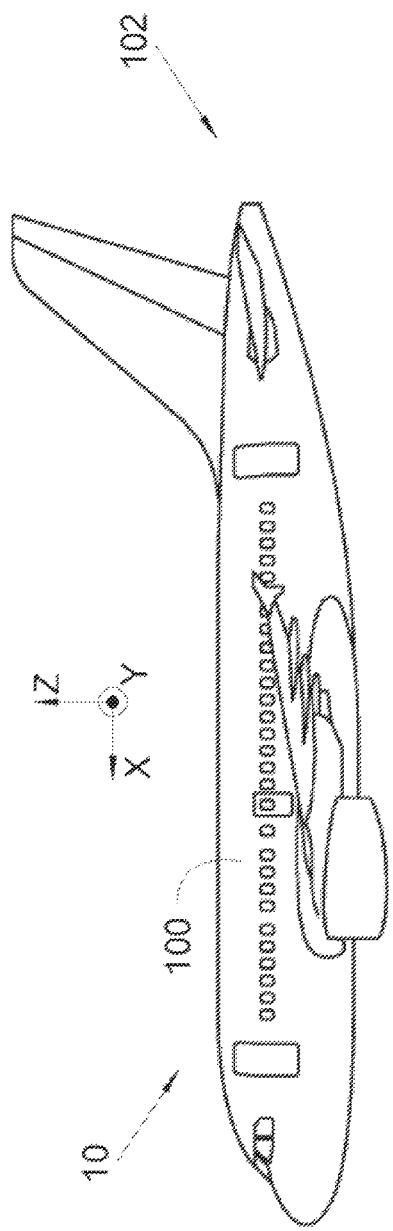
FIG. 1
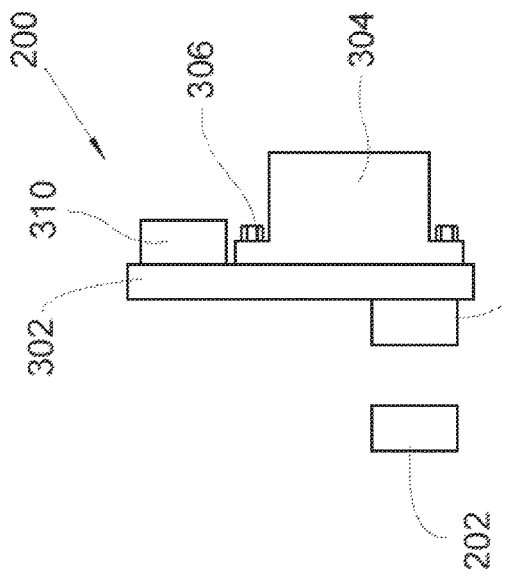
FIG. 2
FIG. 3A

AIRCRAFT COMPRISING AT LEAST ONE EMERGENCY BEACON, AND SUCH AN EMERGENCY BEACON

CROSS-REFERENCE TO RELATED APPLICATION

This U.S. patent application claims priority to and the benefit of French patent application No. 14 58590 filed on Sep. 12, 2014, the entire disclosure of which is incorporated herein by reference.

BACKGROUND

The present disclosure relates to an aircraft comprising at least one emergency beacon, and such an emergency beacon.

Each aircraft is currently equipped with a radio beacon which transmits a distress signal when a problem occurs on the aircraft. Such a radio beacon is designed to transmit a signal that can be picked up by the emergency services all around the world. Such a radio beacon is installed in the fuselage of the aircraft and transmits its signal via an antenna. In a distress landing or when the aircraft is submerged, the antenna and the radio beacon may suffer damage which renders them inoperative.

Another solution, described in the patent FR-A-2 968 276, consists of a radio beacon which is ejected through the fuselage by piercing through it when an incident is detected. The radio beacon is then outside the aircraft and, in the case of submersion, it returns to the surface to transmit a more easily locatable distress signal.

Now, it is possible for a false alarm to trigger the radio beacon, which results in the piercing of the fuselage and then necessitates expensive repairs.

One object of the present disclosure is to propose an aircraft comprising an emergency beacon which does not present the drawbacks of the prior art, and in particular in which the emergency beacon is designed to not result in destruction of the structure of the aircraft when it is triggered and in which its installation does not necessitate any modification of the structure of the aircraft.

To this end, an aircraft is proposed that comprises:
a fuselage having an outer face on which is fixed a second interface,
at least one emergency beacon comprising:
a base having a first interface designed to cooperate with the second interface in order to ensure the fixing of the base onto the outer face, and
a casing in which are housed at least the following electronic components: a control unit, a radio transmitter suitable for transmitting a distress radio signal and detector designed to detect an abnormal behavior of the aircraft, and
fixing structure designed to take up a fixation position in which the fixing structure ensures the fixing of the casing onto the base or a separation position, in which the fixing structure does not ensure the fixing of the casing onto the base, the transition from the fixation position to the separation position being ordered by the control unit when the detector detects an abnormal behavior, and
in which the second interface is a physical and electrical interface designed to receive a navigation lamp, in which the first interface is a physical and electrical interface identical to that of the navigation lamp and in which the base comprises a mounting interface designed to receive a navigation lamp, the mounting interface being a physical and electrical interface identical to that of the second interface.

Such an emergency beacon is therefore ejected from the aircraft from its outer location when an incident is detected and the structure of the aircraft is then not damaged even in the case of a false alarm and its positioning in place of a navigation lamp avoids modifying the structure of the aircraft.

Advantageously, the casing comprises an electrical energy source.

Advantageously, the casing is equipped with an inflatable cushion designed to inflate around the casing.

Advantageously, the casing comprises a parachute designed to be deployed under the control of the control unit after the separation.

Advantageously, the aircraft comprises an electrical network designed to power the electronic components from an energy source located in the aircraft.

Advantageously, the or at least one of the emergency beacons is arranged at the rear of the fuselage.

Advantageously, the control unit comprises a memory area in which is stored a map of the Earth and a database which lists the safety threshold values linked to parameters of the aircraft and that are based on the mapping, the control unit comprises data processing software suitable for comparing the data transmitted by the detector to the database data, and for triggering the fixing structure based on these comparisons.

Advantageously, the control unit comprises a first subunit and a second subunit, each subunit comprises:
a first module designed and configured to deliver a first electrical signal to the fixing structure through a first wired connection; and
a second module designed to deliver a second electrical signal to the fixing structure through a second wired connection; and
for each module, a detector is provided and connected to the module and that is different from those of the others of the first and second modules.

The disclosure herein also provides an emergency beacon for an aircraft according to one of the preceding variants.

BRIEF DESCRIPTION OF THE DRAWINGS

The features of the disclosure herein mentioned above, and others, will become more clearly apparent on reading the following description of an exemplary embodiment, the description being given in relation to the attached drawings, in which:

FIG. 1 represents a side view of an aircraft according to the disclosure herein;

FIG. 2 is an enlargement of the rear of the fuselage of the aircraft of FIG. 1 at its tail unit;

FIGS. 3A through 3C are schematic diagrams of an emergency beacon according to the disclosure herein;

DETAILED DESCRIPTION

Figure 3C:
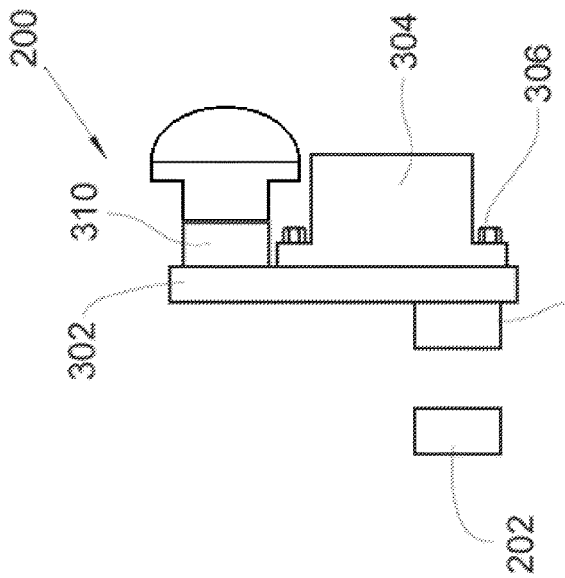

FIG. 1 shows an aircraft 10 comprising a fuselage 100 having a longitudinal axis denoted X, an axis extending horizontally and laterally and denoted Y and an axis extending vertically and denoted Z. The longitudinal axis X is oriented in the direction of advance of the aircraft 10.

At the rear, the fuselage 100 has a cone 102 where an auxiliary power unit is generally arranged.

FIG. 2 shows the cone 102, to the rear of which is fixed an emergency beacon 200, according to the disclosure herein. In the rest of the description, only a single emergency beacon 200 is mentioned, but there could be several such emergency beacons 200 distributed at different points of the fuselage 100 and therefore, more generally, at least one.

Figure 3B:
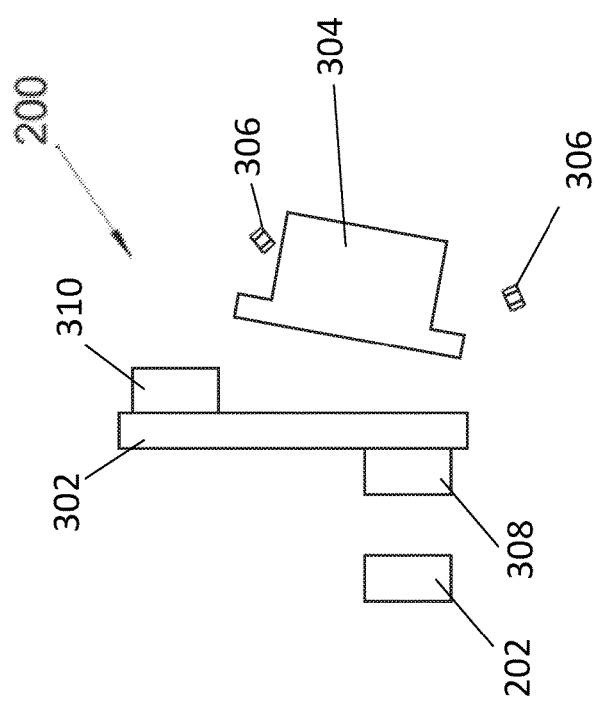

FIGS. 3A through 3C show example embodiments of the emergency beacon 200 which is here dissociated from the fuselage 100. The emergency beacon 200 comprises a base 302 which is fixed against an outer face of the fuselage 100.

Figure 5:
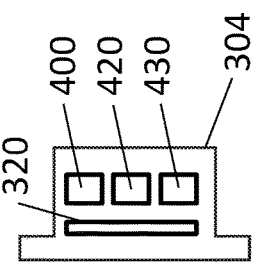
FIG. 5 is a schematic diagram of a casing of the emergency beacon according to FIGS. 3A through 3C.

The emergency beacon 200 also comprises a casing 304 in which are housed various electronic components necessary for its operation. In particular, and as is shown in FIG. 5, the casing 304 houses at least the following electronic components: a control unit 400, a radio transmitter 420 suitable for transmitting a distress radio signal, and a detector 430 designed and configured to detect an abnormal behavior of the aircraft 10.

The detector 430 embedded in the emergency beacon 200 makes the emergency beacon 200 independent of the actions of the personnel onboard the aircraft 10.

The casing 304 is fixed onto the base 302 via fixing structure 306, which is designed to take up a fixation position or a separation position. In the fixation position, as shown in FIGS. 3A and 3C, the fixing structure 306 ensures the fixing of the casing 304 onto the base 302 and, in the separation position, as shown in FIG. 3B, the fixing structure 306 does not ensure the fixing of the casing 304 onto the base 302 and the casing 304 is then released from the base 302. The casing 304 is thus mounted removably on the base 302.

To protect the electronic components that it contains, the casing 304 is preferably water-tight and dust-tight and protect these electronic components in particular from heat and impacts.

As a variant, the casing 304 can comprise thermal protection in the form of a coating of a thermally insulating material such as plastic or rubber.

The transition from the fixation position to the separation position is triggered by an order from the control unit 400 when the detector 430 detects an abnormal behavior of the aircraft 10.

Thus, in normal operation, the fixing structure 306 remains in fixation position and the casing 304 then remains secured to the base 302 and the outside of the fuselage 100. In emergency operation, when the detectors 430 detect an anomaly, they inform the control unit 400 thereof which orders the transition of the fixing structure 306 to separation position and the casing 304 is then released from the base 302 and separates from the fuselage 100.

The fixing of the base 302 onto the fuselage 100 is performed using suitable interfaces. Thus, the base 302 has a first interface 308 and a second interface 202 and is fixed onto the fuselage 100. The two interfaces 202 and 308 are designed to cooperate in order to ensure the fixing of the base 302 onto the outer face of the fuselage 100.

Figure 4:
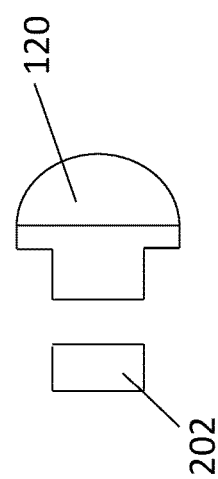
FIG. 4 is a schematic diagram of a navigation lamp mounted on the second interface.

The second interface 202 takes the form of a physical interface designed to receive a navigation lamp 120, as shown in FIG. 4, and the first interface 308 then takes the form of a physical interface similar to that of the navigation lamp 120 and which is designed to cooperate with the physical interface of the second interface 202. Thus, it is easy to fit the emergency beacon 200 in place of an existing navigation lamp 120.

To ensure the fitting of the navigation lamp 120, which is then replaced by the emergency beacon 200, the base 302 has a mounting interface 310 designed to receive the navigation lamp 120, as is shown in the embodiment of FIG. 3C.

It is thus possible to equip the already existing aircraft 10 without it being necessary to modify them and, inasmuch as the emergency beacon 200, and especially the casing 304, are arranged outside the fuselage 100, the separation of the casing 304 from the aircraft 10 does not result in any damage to the fuselage 100.

Once separated, the casing 304 can transmit a distress radio signal by virtue of the radio transmitter 420 controlled by the control unit 400.

To ensure a certain power reserve for the casing 304 when it is detached, or to enable it to operate on the aircraft 10 when no other energy source external to the casing 304 is powering it, it incorporates an electrical energy source 320, as shown schematically in FIG. 5, such as a battery.

The fixing structure 306 in one aspect is pyrotechnic or chemical, such as for example of explosive bolt type, the exploding of which is ordered by the control unit 400.

Figure 8:
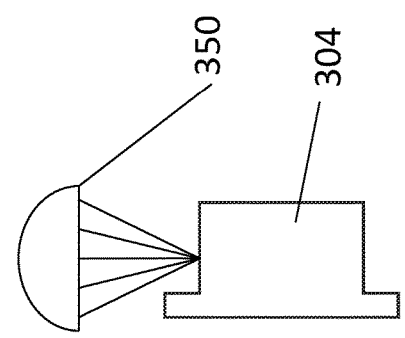
FIG. 8 is a schematic diagram of a memory area contained within a control unit of the emergency beacon.

According to a preferred embodiment, shown schematically in FIG. 8, the control unit 400 comprises a memory area 400M, in which is stored a map of the Earth and the flight plan, and a processor 400P containing at least one data processing software package.

The memory area 400M also stores a database associated with the mapping which lists safety threshold values linked to parameters of the aircraft 10 and that are based on the map such as, for example, the overflight altitude, the speed, the acceleration, the altitude variation, etc., as a function of the position (e.g., longitude, latitude) of the aircraft 10.

The data processing software is suitable for comparing the data transmitted by the detector 430 to the database data, and for triggering the fixing structure 306 to release the casing 304 based on these comparisons.

One of the software packages can be recording software designed to regularly record the data transmitted by the detector 430 in the memory area 400M in order to retrace a history of the flight.

The detector 430 comprises, for example, a GPS sensor which, together with the mapping of the Earth and/or the flight plan, can detect the position and the altitude of the aircraft 10 and deduce therefrom an unsuitable position by comparison with the safety threshold values. For example, the aircraft 10 may be detected, outside of the airport areas, as being too close to the ground or the water and the control unit 400 can then decide to trigger the emergency beacon 200.

The detector 430 comprises, for example, one or more accelerometers which can compute an orientation of the aircraft 10 and, when this orientation does not conform to the safety threshold values of a normal flight and risks causing the aircraft 10 to crash, the control unit 400 can decide to trigger the emergency beacon 200.

Such detector 430 can, for example, assess the altitude and the angle of descent of the aircraft 10 and, if such variables do not conform to those of the flight plan, the control unit 400 can decide to trigger the emergency beacon 200.

Such detector 430 can, for example, assess the speed of approach of the aircraft 10 toward the ground, and, if this speed is higher that it should be and the aircraft 10 risks crashing, the control unit 400 can decide to trigger the emergency beacon 200.

Such detector 430 can, for example, detect that the aircraft has suffered an impact and the control can then decide to trigger the emergency beacon 200.

Figure 6A:
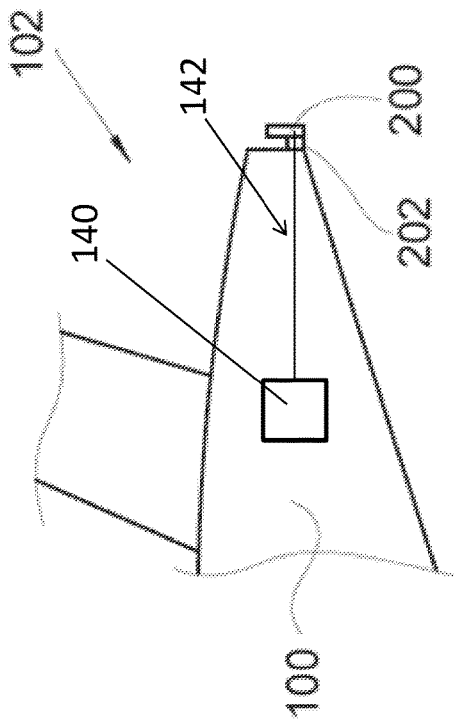
FIG. 6A is a schematic diagram of a casing of the emergency beacon according to FIGS. 3A through 3C surrounded by an inflatable cushion.

To damp the impact on the casing 304 when it reaches the ground or the water, the casing 304, in the example embodiment shown in FIG. 6A, is equipped with an inflatable cushion 340, which is designed to inflate around the casing 304 under the control of the control unit 400 immediately after its detachment from the base 302. The cushion 340 is, for example, of the type of cushion 340 with inflation by explosive chemical reaction. When the cushion 340 is inflated, it completely contains all of the casing 304 and then for example takes the form of a sphere.

Such an inflatable cushion 340 also keep the casing 304 afloat.

Figure 7:
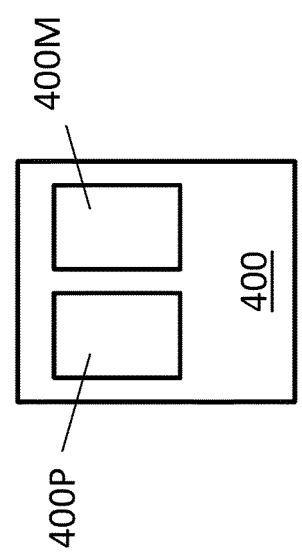
FIG. 7 is a schematic diagram of an energy source of the aircraft connected to an example emergency beacon by an electrical network.

To avoid having the electrical energy source embedded in the casing 304 discharge, the aircraft 10 comprises an electrical network 142, shown in FIG. 7, which is designed to power the electronic components housed in the casing 304 from an energy source 140 located in the aircraft 10. The electrical network 142 comprises electrical connectors and conductors inserted in the aircraft 10 and in the base 302 in order to allow for the electrical powering of the electronic components of the emergency beacon 200 and possibly of the navigation lamp 120 from the aircraft 10.

In particular, electrical connectors are incorporated in the first interface 308, in the second interface 202, and in the mounting interface 310, and the network of conductors appropriately links the different electrical connectors.

The transmission of the distress radio signal makes it possible, by triangulation, to know the position of the casing 304 and therefore approximately that of the aircraft 10.

When the emergency beacon 200 comprises structure or one or more devices making it possible to know the geographic position of the casing 304, the distress radio signal can transmit this position.

Based on the detector 430 contained in the casing 304, the distress radio signal can transmit flight data prior to the jettisoning of the casing 304, such as, for example, the acceleration, the position, the speed of the aircraft 10.

To recharge the electrical energy source, the casing 304 can comprise a recharging system intended to recharge the electrical energy source from the outside environment. The recharging system can comprise, for example, photovoltaic panels, or a system specifically for harvesting the energy of the waves and transforming it into electrical energy The casing 304 can comprise a wired or wireless connection interface, making it possible to update the software implemented in particular in the control unit 400, and the mapping.

Figure 6B:
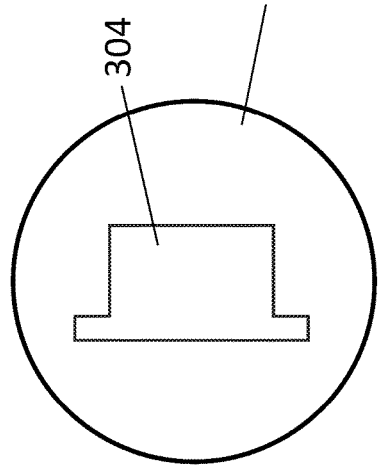
FIG. 6B is a schematic diagram of a casing of the emergency beacon according to FIGS. 3A through 3C connected to a parachute.

To slow down the descent of the casing 304 and reduce the force of the impact with the terrain (ground or water) when it is detached from the aircraft 10, the casing 304, in the example embodiment shown in FIG. 6B, can comprise a parachute 350, which is designed to be deployed under the control of the control unit 400 after the transition to separation position.

At least one of the beacons 200 is advantageously arranged at the rear of the fuselage 10, particularly in the embodiment of the disclosure herein described here, at the rear of the cone 102. Thus, when the casing 304 separates from the base 302, the casing 304 would not be damaged by the rest of the aircraft 10 which continues to move forward.

In the event of an incident on one of the beacons 200, a signal identical to the signal corresponding to a fault of the navigation lamp 120 that the beacon replaces is sent to a monitoring system of the aircraft.

Figure 9:
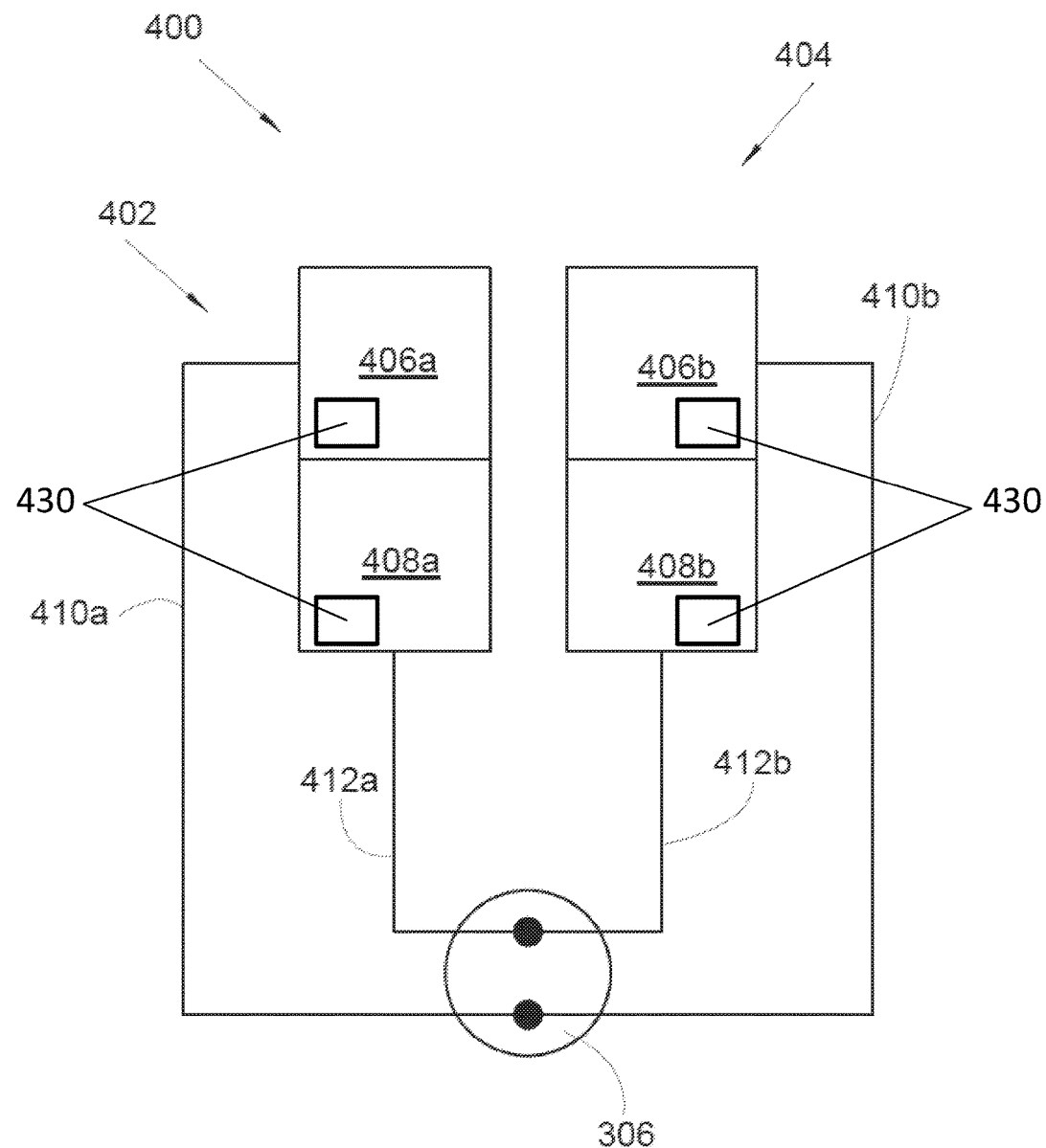
FIG. 9 shows a particular embodiment of a control unit for an emergency beacon according to the disclosure herein.

FIG. 9 shows a control unit 400 which comprises a first subunit 402 and a second subunit 404.

The fixing structure 306 is triggered and switched to the separation position when the first electrical signal and the second electrical signal are received by the fixing structure 306. Such an arrangement avoids having the fixing structure 306 be triggered at the command of a single electrical signal which may be a source of untimely triggering.

The first electrical signal is, for example, a +5 VDC signal and the second electrical signal is, for example, a ground signal.

According to a particular embodiment of the disclosure herein, shown in FIG. 9, first subunit 402 has first and second modules 406a and 408a, respectively while second subunit 404 has first and second modules 406b and 408b, respectively. For each of the first modules 406a and 406b and each of the second modules 408a and 406b, a detector 430 is provided. These detectors 430 are connected to the first modules 406a and 406b and also to the second modules 408a and 408b. The detector 430 in each module (e.g., 406a, 406b, 408a, and 408b) is different from the detector 430 of each of the other modules (e.g., 406a, 406b, 408a, and 408b) to ensure information redundancy.

In the embodiment shown in FIG. 9, the first modules 406a and 406b are connected to the fixing structure 306, respectively, by the first module connection paths 410a and 410b, such that the first module 406a of the first subunit 402 is connected to the fixing structure 306 by the first module connection path 410a, while the first module 406b of the second subunit 404 is connected to the fixing structure 306 by the first module connection path 410b. In a similar fashion, the second modules 408a and 408b are connected to the fixing structure 306, respectively, by the second module connection paths 412a and 412b, such that the second module 408a of the first subunit 402 is connected to the fixing structure 306 by the second module connection path 412a, while the second module 408b of the second subunit 404 is connected to the fixing structure 306 by the second module connection path 412b.

Such an arrangement mitigates a failure of at least two of the first modules 406a and 406b and the second modules 408a and 408b of different types (e.g., one of 406a or 406b and one of 408a or 408b may each be failed without reducing functionality) or of their associated detectors 430, and allow for a triggering of the fixing structure 306.

In effect, if one of the first modules 406a or 406b (e.g., first module 406a) or an associated detector 430 thereof fails, the other first module 406b or 406a (e.g., first module 406b) can deliver the first signal to the fixing structure 306 when the associated detector 430 detects an abnormal behavior. Similarly, if one of the second modules 408a or 408b (e.g., second module 408a) or an associated detector 430 thereof fails, the other second module 408b or 408a (e.g., second module 408b) can deliver the second signal to the fixing structure 306 when the associated detector 430 detects an abnormal behavior.

In such conditions, the fixing structure 306 will receive at least one first signal and at least one second signal and will be triggered.

The subject matter disclosed herein can be implemented at least partially in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a fuselage having an outer face, which comprises a second interface fixed thereon;
   at least one emergency beacon comprising:
      a base having a first interface designed to cooperate with the second interface to fix the base onto the outer face, and
      a casing, in which k housed at least one electronic component, which comprises one or more of a control unit, a radio transmitter suitable for transmitting a distress radio signal, and a detector in electronic communication with the control unit and designed to detect an abnormal behavioral the aircraft; and
   a fixing structure configured to move between and including a fixation position, in which the fixing structure ensures the fixing of the casing onto the base, and a separation position, in which the fixing structure does not ensure fixing of the casing onto the base,
   wherein the control unit is configured to control a position of the fixing structure in the fixation position or in the separation position when the detector detects an abnormal behavior,
   wherein the second interface is a physical and electrical interface designed to receive a navigation lamp,
   wherein the first interface is a physical and electrical interface substantially identical to a physical and electrical interface of the navigation lamp, and
   wherein the base comprises a mounting interface identical to the physical and electrical interface of the second interface and on which the navigation lamp is received.

2. The aircraft according to claim 1, wherein the casing comprises an electrical energy source.

3. The aircraft according to claim 1, wherein the casing is equipped with an inflatable cushion designed to inflate around the casing in a form of a sphere.

4. The aircraft according to claim 1, wherein the casing comprises a parachute configured to be deployed by the control unit after the fixing structure is in the separation position.

5. The aircraft according to claim 1, comprising an electrical network configured to power the at least one electronic component from an energy source located in the aircraft.

6. The aircraft according to claim 1, wherein the at least one emergency beacon is arranged at a rear of the fuselage.

7. The aircraft according to claim 1, wherein the control unit comprises a memory area, in which is stored a mapping of Earth and a database, which lists safety threshold values linked to parameters of the aircraft, wherein the safety threshold values are based on the mapping of Earth, the control unit comprising data processing software configured to compare data transmitted by the detector to the safety threshold values in the database and to control the fixing structure based on these comparisons.

8. The aircraft according to claim 1, wherein the control unit comprises a first subunit and a second subunit, each of the first subunit and the second subunit comprising:
   a first module configured to deliver a first electrical signal to the fixing structure through a first wired connection; and
   a second module configured to deliver a second electrical signal to the fixing structure through a second wired connection;
   wherein, for the first module, a first detector is provided that is connected to the first module,
   wherein, for the second module, a second detector is provided that is connected to the first module, and
   wherein the first detector is different from the second detector.

9. An emergency beacon comprising:
   a base having a first interface designed to cooperate with a second interface located on an outer face of an aircraft fuselage to fix the base onto the outer face;
   a casing, in which is housed at least one electronic component, which comprises one or more of a control unit, a radio transmitter suitable for transmitting a distress radio signal, and a detector in electronic communication with the control unit and designed to detect an abnormal behavior of the aircraft; and
   a fixing structure configured to move between and including a fixation position, in which the fixing structure ensures the fixing of the casing onto the base, and a separation position, in which the fixing structure does not ensure fixing of the casing onto the base,
   wherein the control unit is configured to control a position of the fixing structure in the fixation position or in the separation position when the detector detects an abnormal behavior,
   wherein the second interface is a physical and electrical interface designed to receive a navigation lamp,
   wherein the first interface is a physical and electrical interface substantially identical to a physical and electrical interface of the navigation lamp, and wherein the base comprises a mounting interface identical to the physical and electrical interface of the second interface and on which the navigation lamp is received.

* * * * *